June 23, 1925.
P. H. STEVENS
1,543,402
HYDRAULIC BRAKING DEVICE FOR SHAFT OPERATED LIFTS
Filed July 14, 1924
— *Fig. 1.* —
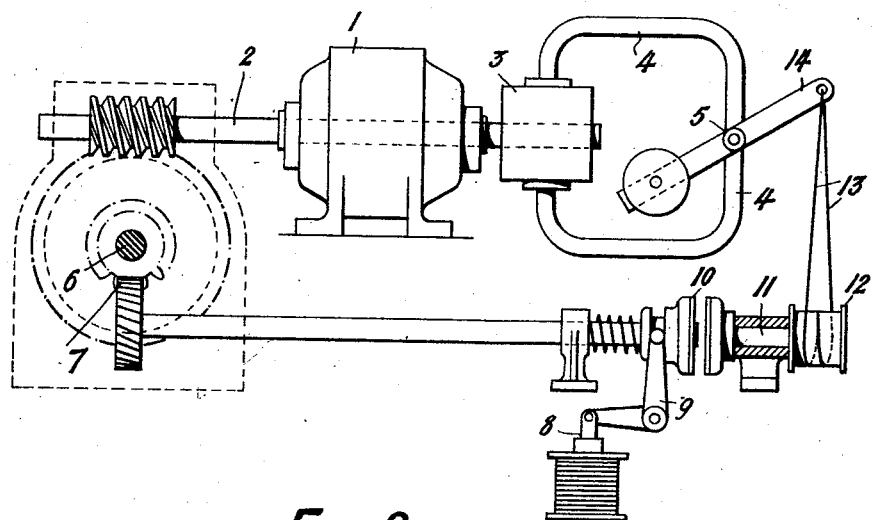
— *Fig. 2.* —
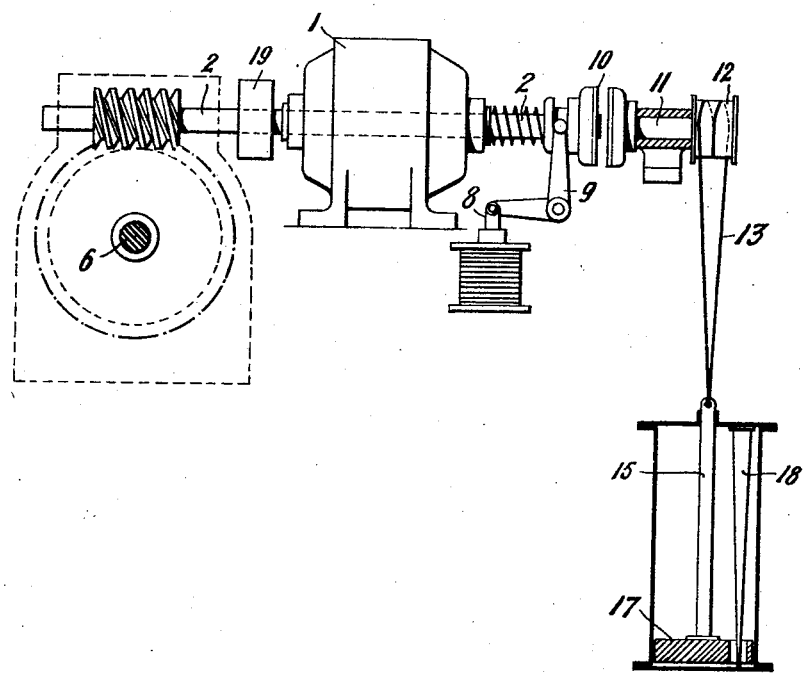

Patented June 23, 1925.

1,543,402

UNITED STATES PATENT OFFICE.

PERCY HERBERT STEVENS, OF NORTHAMPTON, ENGLAND, ASSIGNOR TO SMITH, MAJOR & STEVENS LIMITED, OF NORTHAMPTON, ENGLAND.

HYDRAULIC BRAKING DEVICE FOR SHAFT-OPERATED LIFTS.

Application filed July 14, 1924. Serial No. 725,902.

*To all whom it may concern:*

Be it known that I, PERCY HERBERT STEVENS, a subject of the King of Great Britain, residing at Abbey Works, Northampton, Northamptonshire, England, have invented certain new and useful Improvements in and Connected with Hydraulic Braking Devices for Shaft-Operated Lifts, of which the following is a specification.

The present invention relates to improvements in and connected with braking devices for electric or belt-driven lifts, and has for its object to provide means whereby it is ensured that a lift, either belt-driven or electrically-operated, shall, when stopping automatically at any floor level, come to rest accurately at that floor level irrespective of the load in the cage.

Hitherto electric lifts and belt-driven lifts as usually made for commercial purposes, have been provided with a brake exerting a constant pressure on the brake drum irrespective of the load in the cage. This has the effect, for instance, that a fully loaded cage travelling upwards is stopped more quickly than a lightly loaded cage travelling upwards, because whilst the brake has been of constant power, the mass to be stopped has varied and sometimes also the speed.

Further, any excess of load in the cage over the counterweight assists the brake to stop the cage when it is travelling upwards, and conversely any preponderance of counterweight opposes the braking action. In the downward direction a fully loaded cage also stops at a lower level than a lightly loaded cage.

Now in the case of hydraulically operated lifts, this disability does not occur, because when coming to rest at a floor level, the stopping is effected not by a brake, but by the gradual cutting off of the flow of liquid through the valve, and the ultimate trapping of the liquid when the valve is completely closed for either direction. The effect is that when stopping automatically at a floor level, usually a terminal, the cage is brought to rest when the control rope has travelled a distance that completely cuts off and traps the liquid; this distance is independent of the load in the cage, and as a result the cage stops at the same level, independent of load, if the controlling device is operated at the same point in the travel of the cage.

Now the present invention consists of attaching to an electric or belt-driven lift, an hydraulic device that produces this same effect.

One form of this invention consists in continuously driving an hydraulic pump, in which the exit and return are connected by a pipe in which a valve is situated, which by adjustment permits the pump to run smoothly without resistance, or to resist the rotation of the motor shaft progressively until the said shaft is brought to a positive stop.

Alternatively, instead of continuously running a rotary hydraulic pump and choking the flow in proportion as resistance is required, the shaft of the lift may be allowed to run free and at the required moment be coupled to the hydraulic braking apparatus. In such a construction it is clear that the braking device need not be of the pump type, but may be any hydraulic braking device in which the resistance increases in the required proportion up to the actual stoppage of the shaft.

Where the braking device is not continuously running, but is merely coupled to the shaft by means of a clutch, it may suitably be used in conjunction with the brake usually employed, and still have the effect of ensuring the accurate position of arrest of the cage.

In order that this invention may be clearly understood, reference is made to the accompanying drawings, in which, Figure 1 is a diagrammatic side elevation of an electric shaft-operated lift mechanism in which an hydraulic pump is employed continuously coupled to the shaft, and Figure 2 is a similar view of an electric shaft-operated lift mechanism in which the shaft runs independently of the hydraulic braking device which is only brought into operation by the operation of a clutch.

In the example of construction illustrating this invention as seen at Figure 1, 1 is an electric motor on the shaft 2 of which the hydraulic pump 3 is mounted. The pump 3 is of a type that can be driven in either direction without affecting its operation. The exit side of the pump is connected directly to the return side, so that when the said pump 3 is running, the oil or other medium freely circulates without any substantial work being done. In the pipe which connects the exit to the return, is interposed a throttle valve 5, which is normally open and allows a free passage to the liquid. When the lift cage reaches a point in a predetermined relationship to the floor at which it is desired to stop automatically, this throttle valve 5 is closed gradually and completely, producing a smooth deceleration and accurate stop.

The closing of the valve 5 is effected by a train of gearing between the shaft 6 of the hauling drum or wheel on the winding mechanism and the spindle of the valve 5. The gearing for operating this valve 5 is only coupled to the shaft at the moment of cutting off of the current. The effect is that the motion of the hauling wheel shaft 6 through the train of gearing 7 closes the valve 5, and traps the liquid in the closed circuit pipe 4 when the cage has travelled the predetermined distance which has been settled to give comfortable deceleration with a smooth and accurate stop.

A solenoid 8 is connected to a bell-crank lever 9, which operates a clutch 10, for connecting the train of gearing 7 which communicates with the hauling wheel shaft 6, to an auxiliary shaft 11 carrying a pulley 12. The latter carries two oppositely wound cords 13, which connect to a counterbalance lever 14 for operating the valve 5. When the cage has arrived at the predetermined point where deceleration is required to commence, the breaking of the current releases the solenoid core 8, thus permitting the clutch spring to operate the clutch 10 and causing the hauling wheel shaft 6 to communicate motion to the auxiliary shaft 11 and pulley 12, and thus wind one or other of the cords 13 around the said pulley and progressively rock the counterbalance lever 14, thus gradually closing the valve 5. The gradual closing of the valve reduces the speed of the hydraulic pump 3 at any predetermined rate of deceleration, which may be adjusted as required by the construction of the valve 5 and the proportion of the counterbalance lever 14 which operates it. It will be observed that this trapping of the liquid occurs in a given distance independently of the load carried in the cage.

On remaking the circuit in an electric lift, or on shifting the belt in a belt-driven lift for restarting the machine on its next journey, the valve 5 is automatically opened simultaneously with the closing of the switch or movement of the belt striker, because on the release of the clutch 10 following the making of the circuit, the counterbalance weighted lever 14 returns to its normal position and rotates the shaft 11 back to the position shown in Figure 1.

In the form illustrated at Figure 2, the hydraulic brake, which in this instance is illustrated as a piston moving in a cylinder with a gradually reducing valve aperture between opposite sides of the piston, is only coupled to the motor shaft simultaneously with the cutting off of the current. In this arrangement as illustrated, the releasing of the solenoid 8 rocking the bell crank lever 9 operates the clutch 10 at the moment when the current is cut off from the motor 1, and thus couples the shaft 2 to the auxiliary shaft 11 and causes the pulley 12 to wind the cord 13 and thus lift the piston rod 15. The piston 17 has a hole formed through it from the upper side to the lower side, and in this hole a tapered rod 18 is situated which has the effect of reducing the size of the aperture in the piston 17 progressively as the piston is drawn up by the piston rod 15 being pulled by one of the cords 13. This is merely a diagrammatic means of illustrating how the invention can be carried out by an hydraulic brake having a straight instead of a rotary movement, and it illustrates how the braking device need not be continuously in operation, but need only be brought into operation when deceleration commences to take place. In such a braking device a brake drum 19 may also be fitted with a brake in the ordinary way but of less power.

The application of the hydraulic braking device permits the speed at which electric push button lifts operate to be increased, as when the variation in stopping level with a variation in load is removed, it becomes mechanically possible to increase the speed of automatic lifts to any desired amount and still retain satisfactory stopping at floor levels.

In the case of employing the hydraulic braking device in conjunction with the usual spring applied electrically released brake, the latter is designed of sufficiently small power that if acting alone, under no condition of loading could it stop the lift in a shorter distance than is necessary for the throttle valve to perform its functions.

In the case of the shaft 2 being driven by belts from some other source of power, the electromotor 1 would be replaced by suitable pulleys for receiving the power to be transmitted to the shaft 6.

It will be readily understood that the two mechanisms illustrated of the application of this invention are merely examples of the application of the invention to shaft-operated lifts, and other hydraulic braking devices can be substituted without departing from this invention.

What I claim as my invention and desire to secure by Letters Patent is:—

1. In shaft-operated lifts; an hydraulic braking device, a valve capable of being progressively closed coacting with said hydraulic braking device, means to cause the gradual and complete closure of the valve of said braking device when the lift cage reaches a point in predetermined relationship to a floor at which it is desired to stop, a clutch to connect and disconnect said valve operating means to and from the driving mechanism of the lift, and means to cause the engagement of said clutch to operate the closure of said valve when the lift cage reaches a point in predetermined relationship to the floor at which it is desired to stop.

2. In shaft-operated lifts; the combination with the shaft for operating the lift, and means for driving same; of a clutch member, a revoluble shaft to carry said clutch member in coacting relationship with said lift-operating shaft, a coaxial shaft, bearings to carry said coaxial shaft, a clutch member on said coaxial shaft opposed to said first mentioned clutch member, an hydraulic brake device, means when the lift cage reaches a point in predetermined relationship to the floor at which it is desired to stop to bring said clutch members into engagement and revolve said coaxial shaft, and means connecting said coaxial shaft to the hydraulic brake device to bring said device into effective action to produce a smooth deceleration and accurate stop of the lift cage.

3. In shaft-operated lifts; the combination with the lift-operating shaft, and mechanism in operative connection with said lift-operating shaft for driving same; of an hydraulic pump, means for driving said pump in operative connection with the mechanism for driving the lift-operating shaft, a closed tubular circuit connecting the exit side to the return side of said pump, a valve in said tubular circuit capable of adjustment to gradually and completely close said circuit, a revoluble clutch shaft, bearings to carry said shaft, gearing to drive said shaft in operative connection with the driving mechanism of said lift-operating shaft, a movable clutch member on said clutch shaft, a valve-operating shaft coaxial with said clutch shaft, a clutch member on said coaxial shaft opposed to said clutch member on said clutch shaft, a valve-operating lever connected to said valve of said tubular circuit of said pump, means to bring the movable clutch member on said clutch shaft into relationship with the fixed clutch member on said revoluble coaxial shaft when the lift cage reaches a point in predetermined relationship to the floor at which it is desired to stop to cause said coaxial shaft to revolve, and connecting means between said coaxial shaft and said lever of said valve to gradually close said valve during the rotation of said coaxial shaft to produce a smooth deceleration and accurate stop of the lift cage.

In witness whereof I have hereunto set my hand in the presence of two witnesses.

PERCY HERBERT STEVENS.

Witnesses:
THOMAS W. ROGERS,
CYRIL TREVER.